(12) United States Patent
Vedula et al.

(10) Patent No.: US 7,778,328 B2
(45) Date of Patent: Aug. 17, 2010

(54) SEMANTICS-BASED MOTION ESTIMATION FOR MULTI-VIEW VIDEO CODING

(75) Inventors: Sundar Vedula, Sunnyvale, CA (US); Rohit Puri, San Jose, CA (US); Ali J. Tabatabai, Cupertino, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1147 days.

(21) Appl. No.: 10/816,051

(22) Filed: Mar. 31, 2004

(65) Prior Publication Data

US 2005/0031035 A1  Feb. 10, 2005

Related U.S. Application Data

(60) Provisional application No. 60/493,883, filed on Aug. 7, 2003.

(51) Int. Cl.
H04N 7/12 (2006.01)
H04N 11/02 (2006.01)
H04N 11/04 (2006.01)

(52) U.S. Cl. ........... 375/240.12; 348/48; 382/154

(58) Field of Classification Search ........... 375/240.12; 348/48; 382/154
See application file for complete search history.

(56) References Cited

U.S. PATENT DOCUMENTS

| | | | |
|---|---|---|---|
| 6,043,838 A * | 3/2000 | Chen | 348/42 |
| 6,154,600 A | 11/2000 | Newman et al. | |
| 6,243,599 B1 * | 6/2001 | Van Horn | 600/407 |
| 6,301,370 B1 | 10/2001 | Steffens et al. | |
| 6,353,678 B1 | 3/2002 | Guo et al. | |
| 6,571,024 B1 | 5/2003 | Sawhney et al. | |
| 6,597,818 B2 | 7/2003 | Kumar et al. | |
| 6,606,406 B1 | 8/2003 | Zhang et al. | |
| 6,671,399 B1 * | 12/2003 | Berestov | 382/154 |
| 6,765,965 B1 * | 7/2004 | Hanami et al. | 375/240.16 |
| 2003/0033318 A1 | 2/2003 | Carlbom et al. | |
| 2003/0202592 A1 * | 10/2003 | Sohn et al. | 375/240.16 |

OTHER PUBLICATIONS

Hartley and Zisserman, Multiple View Geometry in Computer Vision, Jun. 2000, Cabridge University Press, 1st Ed., pp. 219-243. http://www.robots.ox.ac.uk/~vgg/hzbook/hzbook1.html.*
M. Accame, F.G.B. De Natale, D.D. Giusto, "Hierarchical block matching for disparity estimation in stereo sequences," icip, vol. 2, pp. 2374, 1995 International Conference on Image Processing (ICIP'95)—vol. 2, 1995.*

(Continued)

*Primary Examiner*—Mehrdad Dastouri
*Assistant Examiner*—Jeremaiah C Huber
(74) *Attorney, Agent, or Firm*—Blakely, Sokoloff, Taylor & Zafman LLP

(57) ABSTRACT

A motion estimation method and apparatus for video coding of a multi-view sequence is described. In one embodiment, a motion estimation method includes identifying one or more pixels in a first frame of a multi-view video sequence, and constraining a search range associated with a second frame of the multi-view video sequence based on an indication of a desired correlation between efficient coding and semantic accuracy. The semantic accuracy relies on use of geometric configurations of cameras capturing the multi-view video sequence. The method further includes searching the second frame within the constrained search range for a match of the pixels identified in the first frame.

27 Claims, 6 Drawing Sheets

Previous Frame

Current Frame

406 — Disparity seed, no use of epipolar line

408 — Disparity seed, bias towards epipolar line

410 — Disparity seed, search along epipolar line only

OTHER PUBLICATIONS

Maria Trujillo, Ebroul Izquierdo, "Exploiting Spatial Variability for Disparity Estimation", available at http://ftp1.de.freebsd.org/Publications/CEUR-WS/vol-233/p19.pdf.*

Chia-Wen Lin, Er-Yin Fei, Yung-Chang Chen "Hierarchical Disparity Estimation Using Spatial Correlation" IEEE Transactions on Consumer Electronics. Aug. 1998, pp. 630-637.*

* cited by examiner

SEMANTICS-BASED MOTION ESTIMATION FOR MULTI-VIEW VIDEO CODING

RELATED APPLICATIONS

The present application claims priority to U.S. Provisional Application Ser. No. 60/493,883, filed Aug. 7, 2003, which is incorporated herein in its entirety.

FIELD OF THE INVENTION

The invention relates to video coding in general. More particularly, the invention relates to performing motion estimation for multi-view video coding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2004, Sony Electronics, Inc., All Rights Reserved.

BACKGROUND OF THE INVENTION

Motion estimation and compensation has proven to be an effective method to reduce the overall bit rate of video sequences. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal.

Conventional motion estimation and compensation methods have been used by various encoders (e.g., MPEG-x encoders, H.26x encoders, etc.), enabling efficient cross-time compression of single-view video sequences. However, while matches produced by these methods may be efficient from a compression perspective, they are often semantically incorrect because they need not represent the underlying "true" motion in the video sequence.

SUMMARY OF THE INVENTION

A motion estimation method and apparatus for video coding of a multi-view sequence is described. An exemplary motion estimation method includes identifying one or more pixels in a first frame of a multi-view video sequence, and constraining a search range associated with a second frame of the multi-view video sequence based on an indication of a desired correlation between efficient coding and semantic accuracy. The semantic accuracy relies on use of geometric configurations of cameras capturing the multi-view video sequence. The method further includes searching the second image within the constrained search range for a match of the pixels identified in the first frame.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
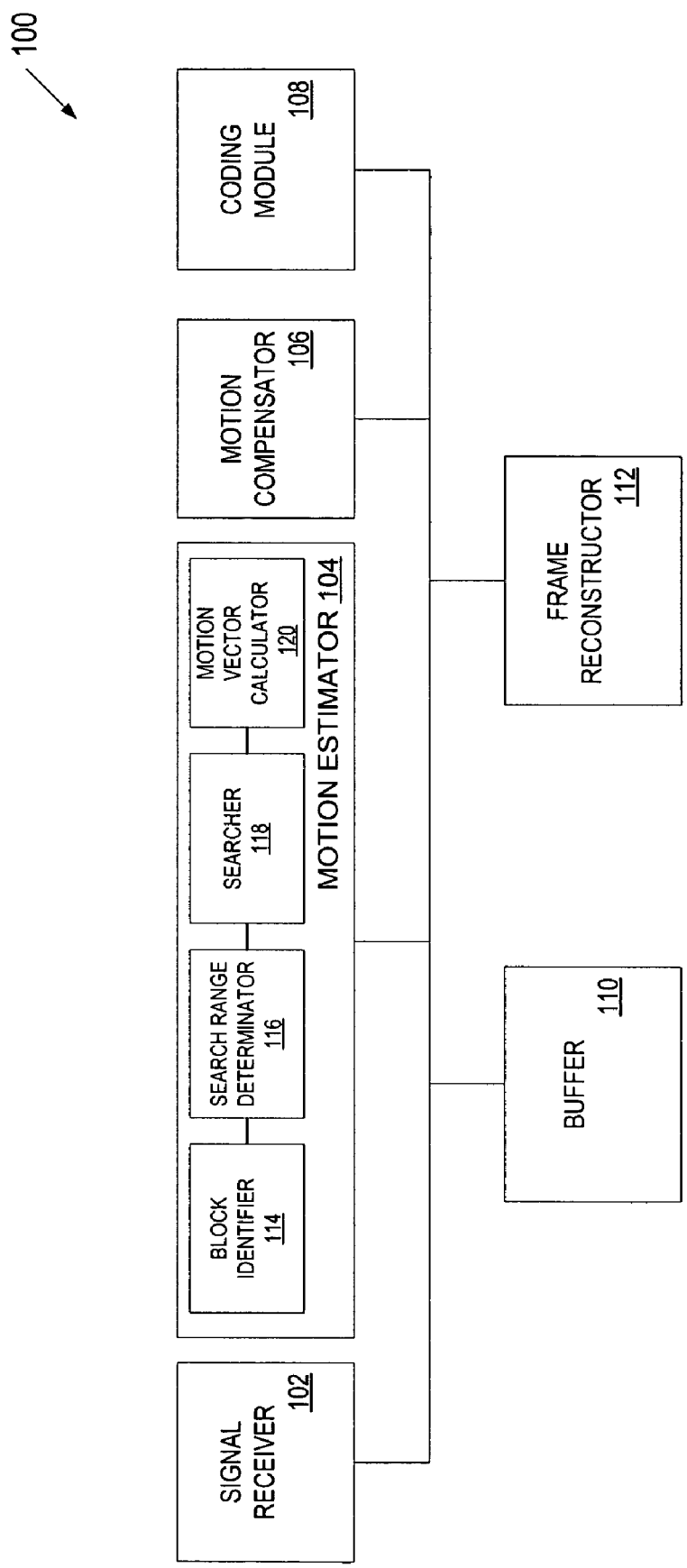
FIG. 1 is a block diagram of one embodiment of an encoding system.

Beginning with an overview of the operation of the invention, FIG. 1 illustrates one embodiment of an encoding system 100. The encoding system 100 performs multi-view coding in accordance with video coding standards such as MPEG-x and H-26x. The encoding system 100 may be implemented in hardware, software, or a combination of both. In software implementations, the encoding system 100 may be stored and distributed on a variety of conventional computer readable media. In hardware implementations, the modules of the encoding system 100 are implemented in digital logic (e.g., in an integrated circuit). Some of the functions can be optimized in special-purpose digital logic devices in a computer peripheral to off-load the processing burden from a host computer.

The encoding system 100 includes a signal receiver 102, a motion estimator 104, a motion compensator 106, a coding module 108, a buffer 110, and a frame reconstructor 112. The frame receiver 102 is responsible for receiving a video signal with a multi-view video sequence and forwarding individual frames contained in the multi-view video sequence to the motion estimator 104.

The motion estimator 104 is responsible for comparing a current frame of the multi-view video sequence with a frame reconstructed from a previous frame and stored in the buffer 110, and estimating motion in the current frame with respect to the previous frame. In particular, the motion estimator 104 searches the reconstructed previous frame for a match of each pixel (or a block of pixels) from the current frame to compute a motion vector for each pixel or block. The resulting motion vectors are passed on to an output of the encoding system 100.

The motion compensator 106 is responsible for reading the motion vectors and the reconstructed previous frame, computing a predicted image for the current frame, and subtracting the predicted image from the current frame, which results in a residual frame.

The coding module 108 is responsible for subjecting the residual frame to various encoding operations to compress the signal, and passing the compressed signal to the output of the encoding system 100. Examples of the encoding operations may include, for example, Discrete Cosine Transform (DCT) in combination with adaptive quantization, differential coding, run-length coding (RLC), variable-length coding (VLC), etc.

The frame reconstructor 112 is responsible for adding the residual frame to the predicted image to obtain a reconstructed current frame, and storing the reconstructed current frame in the buffer 110 for further use by the motion estimator 104 and the motion compensator 106.

In one embodiment, the motion estimator 104 includes a block identifier 114, a search range determinator 116, a searcher 118, and a motion vector calculator 120. The block identifier 114 is responsible for receiving a frame from a multi-view video sequence from the signal receiver 102, dividing this current frame into blocks (or individual pixels), and passing each block (or pixel) to the search range determinator 116.

The search range determinator 116 is responsible for defining a search range within a previous frame of the multi-view video sequence being coded to perform a search for a matching block. The search range determinator 116 determines the search range based on geometric configurations of cameras used to capture the multi-view sequence. The geometric configurations of cameras define multi-view geometry constraints which, when used to determine the search range, enable higher semantic accuracy of matches and help reduce complexity of the search.

In one embodiment, the multi-view geometry constraints are described by the epipolar geometry. In particular, according to the epipolar geometry, for a pair of views looking at the same scene, true semantic matches for any pixel in the first view lie along the epipolar line corresponding to that pixel in the second view. Hence, the search determinator 116 uses the position of the epipolar line in the previous frame to determine the search range for a relevant block. More specifically, the search determinator 116 determines how to constrain the search range with respect to the position of the epipolar line based on a desired correlation between efficient coding and semantic accuracy of matches. That is, for higher semantic accuracy, the search determinator 116 constrains the search range to be closer to the epipolar line. For higher coding efficiency, the search determinator 116 defines the search range to cover a larger area around the epipolar line. In one embodiment, the desired correlation between efficient coding and semantic accuracy of matches is specified by the user (e.g., based on the needs of an application for which the encoding system 100 is used) and can be modified at any point in time.

The searcher 118 is responsible for searching the previous frame within the determined search range for a matching block, and the motion vector calculator 120 is responsible for computing a motion vector for this block.

Accordingly, the encoding system 100 combines multi-view geometry constraints with block-based matching to achieve better semantic accuracy of matching. This approach is referred to herein as semantics-based motion estimation. Furthermore, the encoding system 100 can vary the hardness of the constraint to allow a user to control the correlation between efficient compression and semantic accuracy of matching.

Figure 2:
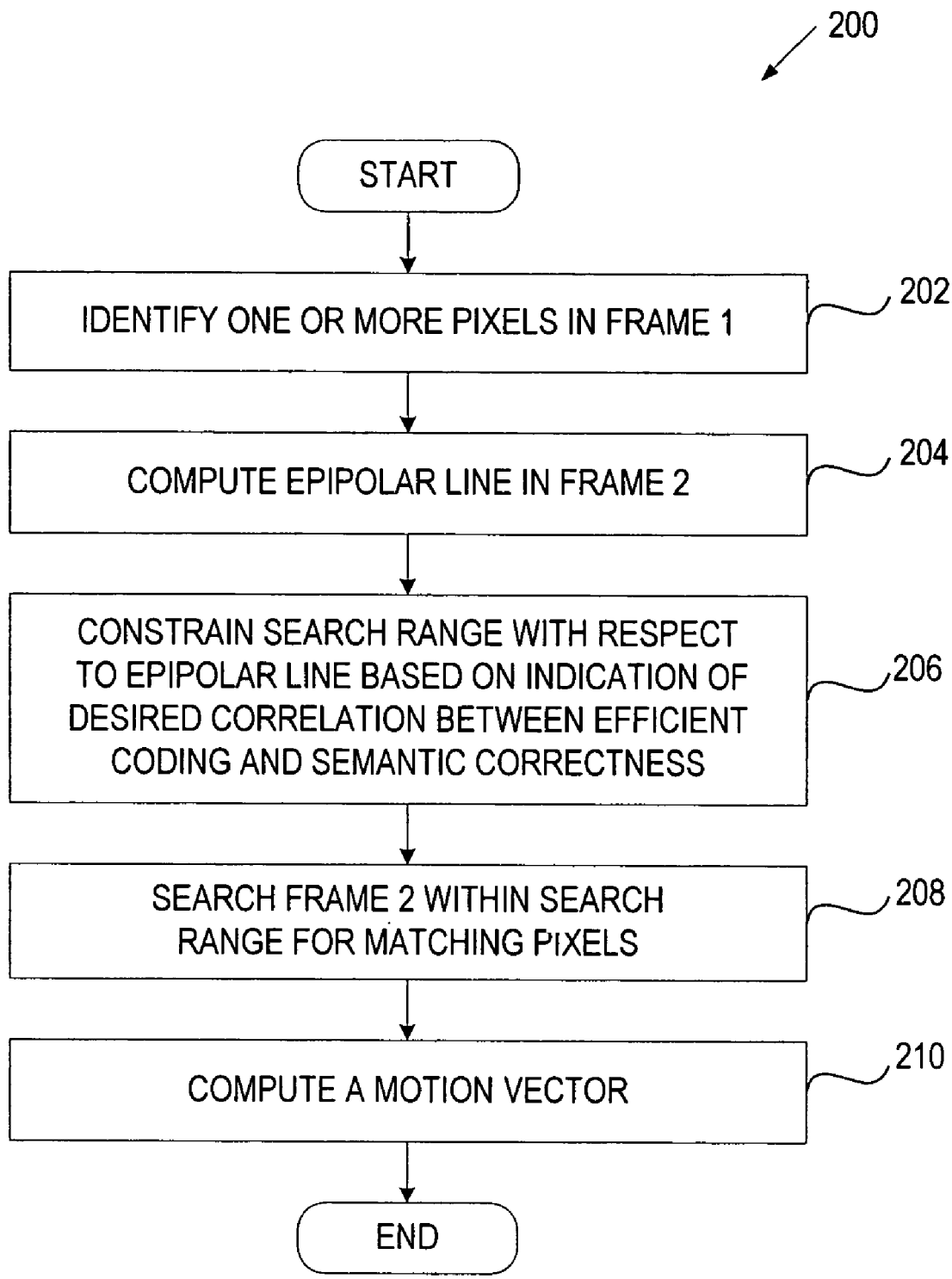
FIG. 2 is a flow diagram of one embodiment of a process for performing motion estimation for a multi-view video sequence.
Figure 3:
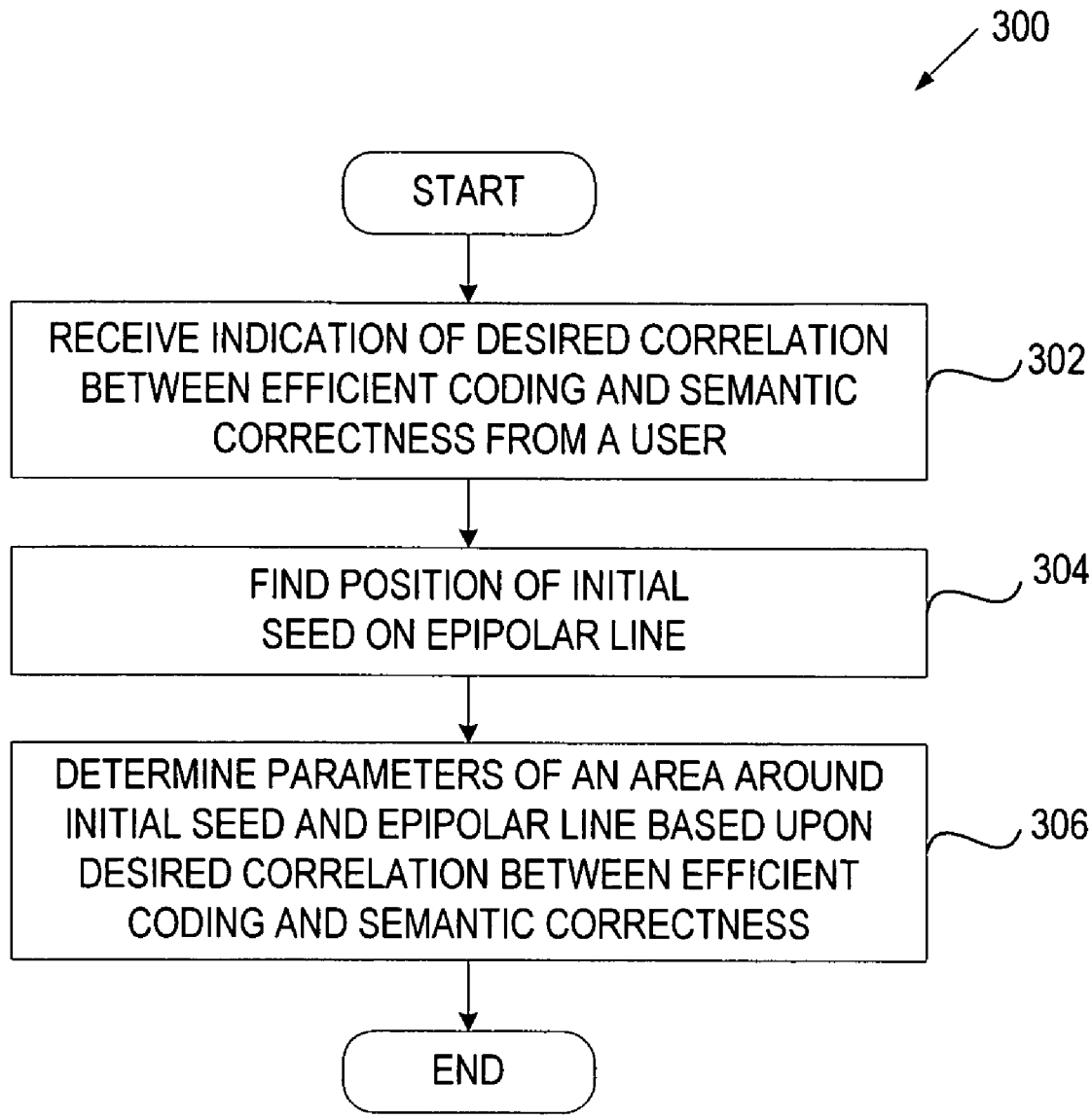
FIG. 3 is a flow diagram of one embodiment of a process to define a search range for motion estimation using a seeding approach.

FIGS. 2 and 3 are flow diagrams of motion estimation processes that may be performed by a motion estimator 104 of FIG. 1, according to various embodiments of the present invention. The process may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 2 and 3 without departing from the scope of the invention and that no particular order is implied by the arrangement of blocks shown and described herein.

FIG. 2 is a flow diagram of one embodiment of a process 200 for performing motion estimation for a multi-view video sequence.

Referring to FIG. 2, processing logic begins with identifying one or more pixels in a first frame of the multi-view video sequence (processing block 202). The first frame is a frame being currently processed. The one or more pixels may represent a block or an individual pixel.

At processing block 204, processing logic accesses a second frame of the multi-view video sequence and computes the epipolar line corresponding to the above pixels of the first frame within the second frame. The second frame is a previously processed frame (e.g., reconstructed by the motion estimator 104 and stored in the buffer 110). In one embodiment, in which motion estimation is performed for individual pixels of the first frame, the epipolar line corresponds to a relevant pixel. In another embodiment, in which motion estimation is performed for blocks within the first frame, the epipolar line corresponds to a pixel at a predefined position within a relevant block. In one embodiment, the epipolar line is computed using the fundamental matrix (known as F matrix), which is an algebraic representation of the epipolar geometry. The computation of the epipolar line may be expressed as follows:

$$l_1 = Fx_0,$$

wherein $l_1$ is the epipolar line in the second image that corresponds to the pixel $x_0$ in the first image.

It will be understood by a person skilled in the art that the epipolar line can be computed using any other known means without loss of generality. Next, processing logic uses the computed epipolar line to define a search range for finding matching pixels in the second image. In particular, at processing block 206, processing logic constrains the search range with respect to the epipolar line based on an indication of a desired correlation between efficient coding and semantic accuracy of matching. In particular, the desired correlation defines the proximity of the search range to the epipolar line (e.g., if the importance of semantic accuracy overweighs the importance of efficient coding, processing logic constrains the search range to be closer to the epipolar line, and vice versa). In one embodiment, the indication of the desired correlation between efficient coding and semantic accuracy is specified by a user via a user interface provided by processing logic. In one embodiment, an initial seed is used to further constrain the search range with respect to a specific location on the epipolar line, as will be discussed in more detail below. In another embodiment, a seed is not used. Rather, the first and second frames are rectified to satisfy the property that for any pixel in a frame, the corresponding epipolar line in the other frame must be horizontal and scanline aligned with the location of the pixel. Rectification is the process of computing a homography, or 2D projective warp for each of the two frames, and applying these warps. Various algorithms can be used to compute the rectifying homographies and warp the frames accordingly.

At processing block 208, processing logic searches the second frame within the search range determined at processing block 208 for a match of the one or more pixels from the first frame.

Afterwards, at processing block 210, processing logic computes a motion vector based on the change of position of the pixels.

FIG. 3 is a flow diagram of one embodiment of a process 300 to define a search range for motion estimation using a seeding approach.

Referring to FIG. 3, processing logic begins with receiving an indication of a desired correlation between efficient coding and semantic accuracy of matching from a user (processing block 302). In one embodiment, the indication is received by communicating to the user a user interface that allows the user to indicate the desired correlation between these two factors. For example, the user interface may present the cumulative weight or percentage for both factors (e.g., 100%) and allow the user to distribute the cumulative weight or percentage between the two factors (e.g., the user may assign 20% to the efficient coding factor and 80% to the semantic accuracy factor). Alternatively, the user interface may provide a slider activated by the user to specify the desired correlation between the two factors.

At processing block 304, processing logic finds the position of an initial seed on the epipolar line for the block being coded. In one embodiment, the initial seed is found using a disparity vector. Disparity vectors are computed by stereo algorithms for each pixel of the first image to find the most semantically accurate match in another view that captures the same scene at the same snapshot in time but from a different viewpoint. When such disparity vectors are available, a relevant disparity vector is used as an initial seed.

At processing block 306, processing logic determines parameters of a window around the initial seed and the epipolar line based on the desired correlation between efficient coding and semantic accuracy of matching. In one embodiment, the metric for discerning the optimal match for the block being coded can be expressed as follows:

$$\vec{mv}_{best} = \arg\min[SAD(\vec{mv}) + \lambda_x . mvbits^x(mv_d^x) + \lambda_y . mvbits^y(mv_d^y)]\vec{mv} \in S_{disp}^w$$

wherein $mv_d^x$, $mv_d^y$ correspond to motion vector displacements from the disparity vector seeded location, respectively parallel and perpendicular to the epipolar line. $S_{disp}^w$ corresponds to the set of all candidate predictors in a search window (size w×w) around the seed location provided by the disparity vector. SAD denotes the pixel-by-pixel sum of absolute differences between the block to be coded and the predictor block indicated by the candidate $\vec{mv}$. mvbits ($mv_d$) represents the number of bits required to code the differential motion vector (it is an increasing function of the magnitude of the motion vector). $\lambda$ is the appropriate Lagrange multiplier corresponding to the target quality.

By decreasing the relative values of $\lambda_x$ with respect to $\lambda_y$, processing logic can force the match to lie closer to the epipolar line ensuring better semantic correctness. The case $\lambda_y = \infty$ corresponds to a search along the epipolar line. This special case involves just the use of the multi-view geometry to obtain the epipolar line obviating the need to obtain disparity vectors.

The use of disparity vector as a seed for motion search enables a relatively small search window around the seed and results in matches that have good compression efficiency and semantic accuracy. In addition, the use of a smaller search window leads to a reduction in complexity of the search process. Further, because good semantic matches are usually close to the epipolar line, the search becomes mostly 1-D (rather than a 2-D search in standard motion estimation), thus further reducing the complexity of the search process.

Figure 4:
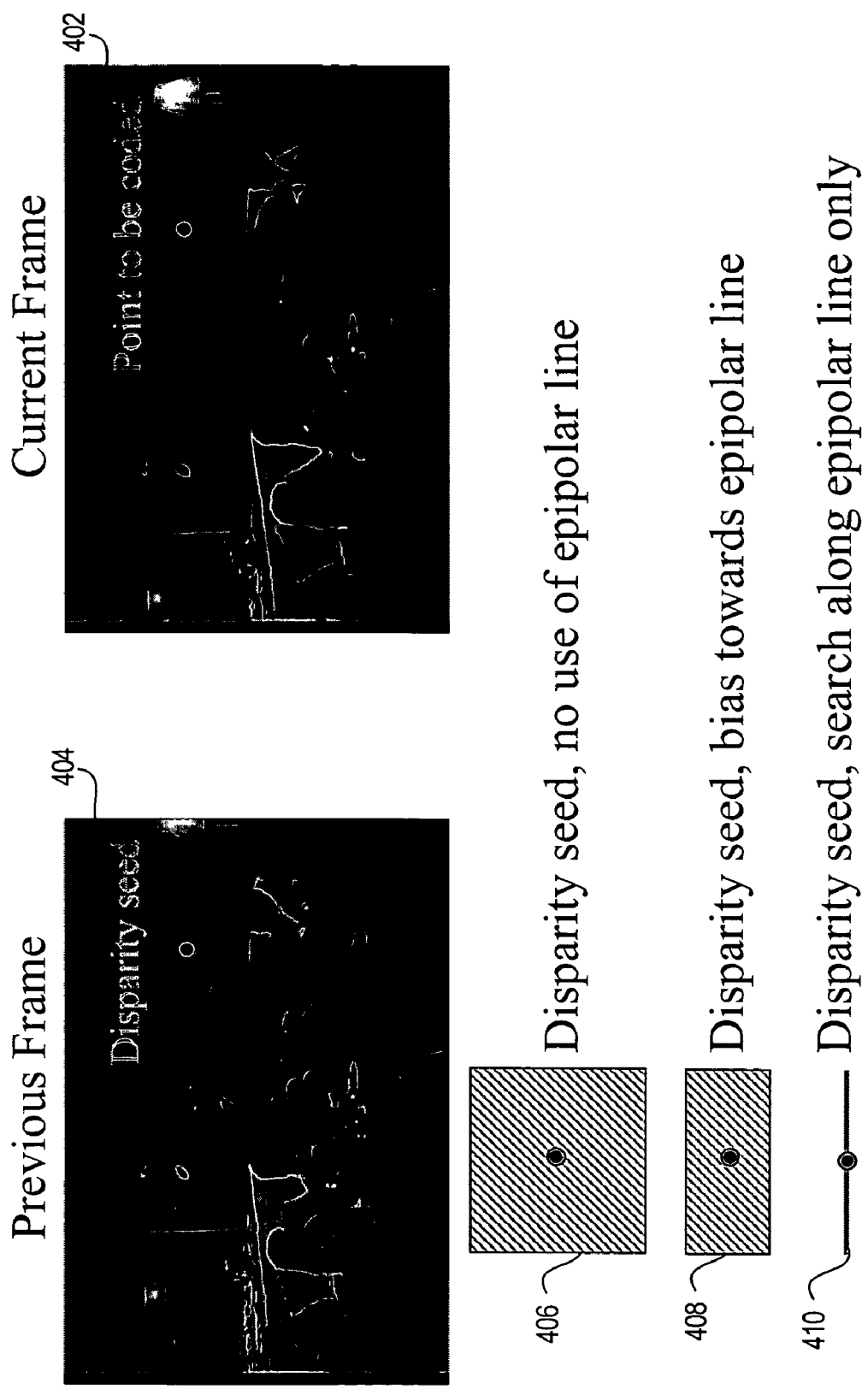
FIG. 4 illustrates two exemplary frames of a multi-view video sequence.

FIG. 4 illustrates two exemplary frames of a multi-view video sequence. For a point being coded in a frame 402, a disparity seed is found in a previous frame 404. A window 406 illustrates conventional motion estimation, in which a search range defined around the disparity seed is not constrained based on the position of the epipolar line. A window 408 illustrates motion estimation that incorporates epipolar geometry constraints to influence the search range defined around the disparity seed and close to the epipolar line. A window 410 illustrates motion estimation that targets high semantic accuracy by limiting the search range to lie along the epipolar line.

Figure 5:
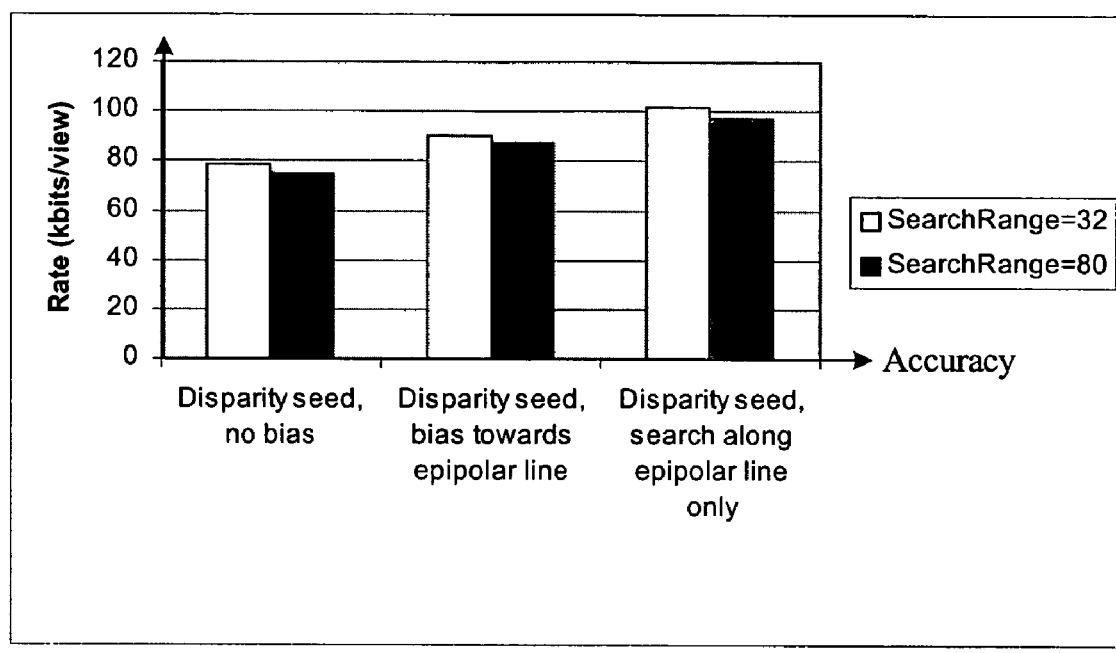
FIG. 5 illustrates a comparison of bitrates obtained by experimenting with different motion estimation methods for a multi-view video sequence.

FIG. 5 illustrates a comparison of bitrates obtained by experimenting with different motion estimation methods for a multi-view video sequence. The first column shows the bitrate for the case of standard motion estimation, where the motion search uses disparity vector as a seed for motion search. This method uses a small search window around the seed and provides for matches having good compression efficiency. This corresponds to the case when the relative weights of the horizontal and vertical Lagrange multipliers are similar, resulting in maximum compression.

Columns 2 and 3 show the case with a stronger bias towards keeping the match close to the epipolar line (greater horizontal Lagrange multiplier). These result in better semantic accuracy since the match is being constrained closer to the epipolar constraint, but the compression efficiency is reduced as a result.

Figure 6:
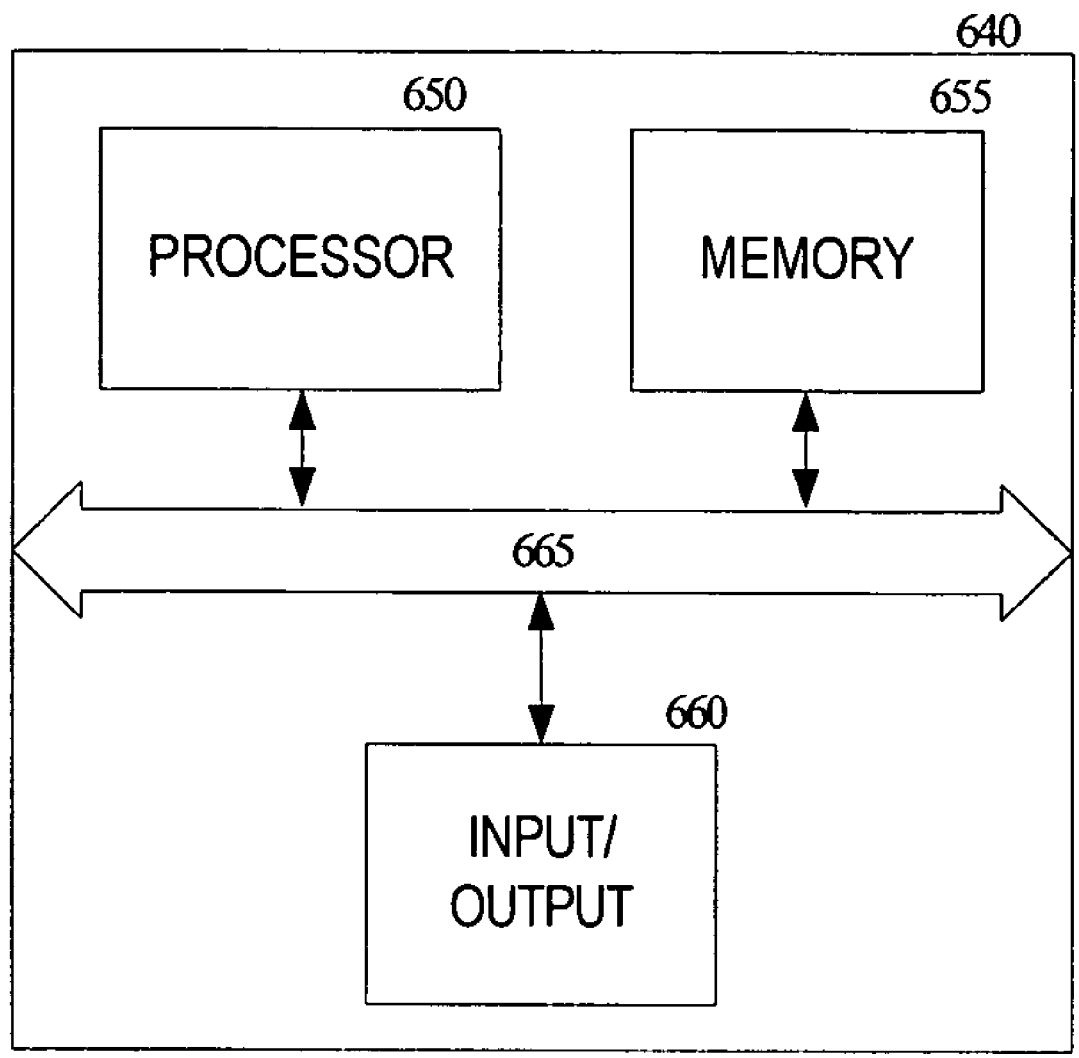
FIG. 6 is a block diagram of a computer environment suitable for practicing embodiments of the present invention.

The following description of FIG. 6 is intended to provide an overview of computer hardware and other operating components suitable for implementing the invention, but is not intended to limit the applicable environments. FIG. 6 illustrates one embodiment of a computer system suitable for use as an encoding system 100 or just a motion estimator 104 of FIG. 1.

The computer system 640 includes a processor 650, memory 655 and input/output capability 660 coupled to a system bus 665. The memory 655 is configured to store instructions which, when executed by the processor 650, perform the methods described herein. Input/output 660 also encompasses various types of computer-readable media, including any type of storage device that is accessible by the processor 650. One of skill in the art will immediately recognize that the term "computer-readable medium/media" further encompasses a carrier wave that encodes a data signal. It will also be appreciated that the system 640 is controlled by operating system software executing in memory 655. Input/output and related media 660 store the computer-executable instructions for the operating system and methods of the present invention. The motion estimator 104 shown in FIG. 1 may be a separate component coupled to the processor 650, or may be embodied in computer-executable instructions executed by the processor 650. In one embodiment, the computer system 640 may be part of, or coupled to, an ISP (Internet Service Provider) through input/output 660 to transmit or receive image data over the Internet. It is readily apparent that the present invention is not limited to Internet access and Internet web-based sites; directly coupled and private networks are also contemplated.

It will be appreciated that the computer system 640 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Various aspects of selecting optimal scale factors have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A difference vector estimation method comprising:
   identifying, by a computer, one or more pixels in a first frame of a multi-view video sequence;
   constraining a search range associated with a second frame of said multi-view video sequence to a first area vertically centered on an epipolar line in the second frame, wherein said epipolar line corresponds to said one or more pixels in the first frame, the first area is defined by a having a vertical height specified by a first correlation between efficient compression and semantic accuracy received by the computer from a user, wherein said vertical height increases if the first correlation is weighted toward efficient compression and said vertical height decreases if the first correlation is weighted toward semantic accuracy, wherein semantic accuracy relies on use of geometric configurations of cameras capturing the multi-view video sequence, wherein the vertical direction is defined as the direction perpendicular to said epipolar line, and wherein said search range is further constrained using a disparity vector computed for said one or more pixels in the first frame and wherein the constrained search range is repositioned relative to said epipolar line using said disparity vector in addition to constraining said vertical height using the first correlation;
   searching the second frame within said constrained search range for a match of said one or more pixels identified in the first frame for subsequent use in computing a difference vector for said one or more pixels in the first frame, said difference vector to be transmitted as part of a compressed representation of the first frame;
   receiving a second correlation between efficient compression and semantic accuracy from the user; and
   searching a third frame within a search range constrained by a second correlation between efficient compression and semantic accuracy, the second correlation specified by the user and a value of the second correlation is different from a value of the first correlation.

2. The method of claim 1 wherein the position of the epipolar line depends on the geometric configurations of the cameras.

3. The method of claim 1 wherein the one or more pixels in the first frame represent a block.

4. The method of claim 1 further comprising:
   computing the epipolar line in the second frame.

5. The method of claim 4 wherein the epipolar line is computed using a fundamental matrix.

6. The method of claim 1 wherein constraining the search range comprises:
   determining parameters of a window covering an initial seed and the epipolar line based on the first correlation between efficient compression and semantic accuracy.

7. The method of claim 1 further comprising:
   communicating to a user a user interface facilitating user input of the first correlation between efficient compression and semantic accuracy.

8. The method of claim 7 wherein the user interface provides a slider to enable the user to specify the first correlation between efficient compression and semantic accuracy.

9. The method of claim 7 wherein the user interface allows the user to modify a previously specified correlation between efficient compression and semantic accuracy at any time.

10. A non-transitory computer readable memory medium that provides computer program instructions, which when executed on a computer processor cause the processor to perform operations comprising:
    identifying one or more pixels in a first frame of a multi-view video sequence;
    constraining a search range associated with a second frame of the multi-view video sequence to a first area vertically centered on an epipolar line in the second frame, wherein said epipolar line corresponds to the one or more pixels in the first frame, the first area is defined by having a vertical height specified by a first correlation between efficient compression and semantic accuracy received from a user, wherein said vertical height increases if the first correlation is weighted toward efficient compression and said vertical height decreases if the first correlation is weighted toward semantic accuracy, wherein semantic accuracy relies on use of geometric configurations of cameras capturing the multi-view video sequence, wherein the vertical dimension is defined as the direction perpendicular to said epipolar line and wherein said search range is further constrained using a disparity vector computed for said one or more pixels of the first frame and wherein said constrained search range is repositioned relative to the said epipolar line using said disparity vector in addition to constraining said vertical height using the first correlation;

searching the second frame within said constrained search range for a match of said one or more pixels identified in the first frame for subsequent use in computing a difference vector for the one or more pixels, said difference vector to be transmitted as part of a compressed representation of the first frame;

receiving a second correlation between efficient compression and semantic accuracy from the user; and searching a third frame within a search range constrained by a second correlation between efficient compression and semantic accuracy, the second correlation specified by the user and a value of the second correlation is different from a value of the first correlation.

11. The computer readable memory medium of claim 10 wherein the position of the epipolar line depends on the geometric configurations of the cameras.

12. The computer readable memory medium of claim 10 wherein the one or more pixels in the first frame represent a block.

13. The computer readable memory medium of claim 10 wherein the operations further comprise:
computing the epipolar line in the second frame.

14. The computer readable memory medium of claim 13 wherein the epipolar line is computed using a fundamental matrix.

15. The computer readable memory medium of claim 10 wherein constraining the search range comprises:
determining parameters of a window covering an initial seed and the epipolar line based on the first correlation between efficient compression and semantic accuracy.

16. The computer readable memory medium of claim 10 wherein the operations further comprise:
communicating to a user a user interface facilitating user input of the first correlation between efficient compression and semantic accuracy.

17. A computerized system comprising:
a memory; and
at least one processor coupled to the memory, the at least one processor executing a set of instructions which cause the at least one processor to identify one or more pixels in a first frame of a multi-view video sequence, constrain a search range associated with a second frame of the multi-view video sequence to a first area vertically centered on an epipolar line in the second frame, wherein said epipolar line corresponds to said one or more pixels in the first frame, the first area is defined by having a vertical height specified by a first correlation between efficient compression and semantic accuracy received from a user, wherein said vertical height increases if the first correlation is weighted toward efficient compression and said vertical height decreases if the first correlation is weighted toward semantic accuracy, wherein semantic accuracy relies on use of geometric configurations of cameras capturing the multi-view video sequence, wherein the vertical dimension is defined as the direction perpendicular to said epipolar line, and wherein said search range is further constrained using a disparity vector computed for said one or more pixels in the first frame and wherein said constrained search range is repositioned relative to said epipolar line using said disparity vector in addition to constraining said vertical height using the first correlation,
search the second frame within said constrained search range for a match of said one or more pixels identified in the first frame for subsequent use in computing a difference vector for said one or more pixels in the first frame, said difference vector to be transmitted as part of a compressed representation of the first frame,
receive a second correlation between efficient and semantic accuracy from the user, and
search a third frame within a search range constrained by a second correlation between efficient compression and semantic accuracy, the second correlation specified by the user and the second correlation different from the first correlation.

18. The system of claim 17 wherein the position of the epipolar line depends on the geometric configurations of the cameras.

19. The system of claim 17 wherein the one or more pixels in the first frame represent a block.

20. The system of claim 17 wherein the processor is to constrain the search range by determining parameters of a window covering an initial seed and the epipolar line based on the first correlation between efficient compression and semantic accuracy.

21. The system of claim 17 wherein the processor is further to communicate to the user a user interface facilitating user input of the first correlation between efficient compression and semantic accuracy.

22. A difference vector estimation apparatus comprising:
a block identifier to identify one or more pixels in a first frame of a multi-view video sequence;
a search range determinator to constrain a search range associated with a second frame of the multi-view video sequence to a first area vertically centered on an epipolar line in the second frame, wherein said epipolar line corresponds to said one or more pixels in the first frame, the first area is defined by having a vertical height specified by a first correlation between efficient compression and semantic accuracy received from a user, wherein said vertical height increases if the first correlation is weighted toward efficient compression and said vertical height decreases if the first correlation is weighted toward semantic accuracy, wherein semantic accuracy relies on use of geometric configurations of cameras capturing the multi-view video sequence, wherein the vertical direction is defined as the direction perpendicular to the epipolar line wherein said search range determinator is configured to further constrain the search range using a disparity vector computed for said one or more pixels in the first frame and wherein said constrained search range is repositioned relative said epipolar line using said disparity vector in addition to constraining said vertical height using the first correlation; and
a searcher to search the second image within said constrained search range for a match of said one or more pixels identified in the first frame for use by a difference vector calculator to compute a difference vector for the one or more pixels, said difference vector to be transmitted as part of a compressed representation of the first frame, and to search a third image within a search range constrained by a second correlation between efficient compression and semantic accuracy, the second correlation received from the user and different from the first correlation.

23. The apparatus of claim 22 wherein the position of the epipolar line depends on the geometric configurations of the cameras.

24. The apparatus of claim 22 wherein the one or more pixels in the first frame represent a block.

25. The apparatus of claim 22 wherein the search range determinator is further to compute the epipolar line in the second frame.

26. The apparatus of claim 22 wherein the search range determinator is to constrain the search range by determining parameters of a window covering an initial seed and the epipolar line based on the first correlation between efficient compression and semantic accuracy.

27. The apparatus of claim 22 wherein the search range determinator is further to communicate to the user a user interface facilitating user input of the first correlation between efficient compression and semantic accuracy.

* * * * *